(12) United States Patent
Chang et al.

(10) Patent No.: US 7,743,393 B2
(45) Date of Patent: Jun. 22, 2010

(54) HEAT-DISSIPATING STRUCTURE OF DISC DRIVE

(75) Inventors: Nai-Wen Chang, Hsinchu (TW);
Wen-Hong Wang, Hsinchu (TW);
Jui-Nan Chuang, Hsinchu (TW);
Shih-Lin Yeh, Hsinchu (TW)

(73) Assignee: Lite-On It Corp., Taipei (TW)

( * ) Notice: Subject to any disclaimer, the term of this patent is extended or adjusted under 35 U.S.C. 154(b) by 607 days.

(21) Appl. No.: 11/802,872

(22) Filed: May 25, 2007

(65) Prior Publication Data

US 2007/0288945 A1 Dec. 13, 2007

(30) Foreign Application Priority Data

Jun. 9, 2006 (TW) .............................. 95120627 A

(51) Int. Cl.
*G11B 33/02* (2006.01)
(52) U.S. Cl. .................................................... 720/603
(58) Field of Classification Search ........................ None
See application file for complete search history.

(56) References Cited

U.S. PATENT DOCUMENTS

| | | | | |
|---|---|---|---|---|
| 6,212,147 B1 * | 4/2001 | Ishihara | ...................... | 720/612 |
| 6,317,402 B1 * | 11/2001 | Huang et al. | ................. | 720/603 |
| 6,392,976 B1 * | 5/2002 | Lin | ............................. | 720/611 |
| 6,826,768 B2 * | 11/2004 | Wu et al. | ..................... | 720/651 |
| 7,543,310 B2 * | 6/2009 | Shizuya et al. | .............. | 720/601 |
| 2004/0047267 A1 * | 3/2004 | Chen et al. | .................. | 369/75.2 |
| 2005/0015782 A1 * | 1/2005 | Wang | ......................... | 720/603 |
| 2006/0085802 A1 * | 4/2006 | Guo et al. | .................... | 720/603 |
| 2006/0288356 A1 * | 12/2006 | Wu | ............................. | 720/613 |
| 2006/0288358 A1 * | 12/2006 | Wu | ............................. | 720/649 |
| 2007/0006241 A1 * | 1/2007 | Wang et al. | .................. | 720/611 |
| 2008/0184279 A1 * | 7/2008 | Watabe et al. | ............... | 720/601 |

\* cited by examiner

*Primary Examiner*—Mark Blouin
(74) *Attorney, Agent, or Firm*—Ming Chow; Sinorica, LLC

(57) ABSTRACT

A heat-dissipating structure of a disc drive comprises a tray and a diversion plate. The tray has a body with a concavity loading surface for loading a disc to be in and out the disc drive, and the loading surface has a central hole. Further the diversion plate is disposed on one side of the loading surface, and connected to the loading surface, wherein the diversion plate extends downward and slopes from the connection of the diversion plate and the loading surface.

9 Claims, 4 Drawing Sheets

HEAT-DISSIPATING STRUCTURE OF DISC DRIVE

FIELD OF THE INVENTION

The present invention relates to a heat-dissipating structure of a disc drive, more particularly to a heat-dissipating structure of a tray for promoting the cooling function of an optical pickup unit (OPU).

BACKGROUND OF THE INVENTION

Due to the limited size in the half-height disc drive, the electronic elements disposed in the disc drive are full of capacity thereof. While more functions added to the disc drive, the heat generated from the elements are continuously increased. Therefore, to consider the heat-dissipating requirements for the elements is a must, such as the heat-dissipating conditions for an optical pickup unit (OPU). Especially, in case the disc drive with the Blue-Ray System, the temperature in the Laser Diode almost closes to the upper limit of the operated temperature. Hence, to improve the heat-dissipating ability for such inside elements may be rush at the field.

FIG. 1 illustrates a schematic view of a disc drive 1 based on prior arts. The disc drive 1 has a tray 10 with sliding function for loading a disc 11 into/out of the disc drive 1. The tray 10 had a body 101 having a concavity defined as a first loading surface 1012, and inside of the first loading surface 1012 has a concavity defined as a second loading surface 1014. The first loading surface 1012 and the second loading surface 1014 form an area to hold the discs with different sizes, and this area has a central hole 1016 for a spindle motor rotating the disc 11 and an OPU reading/writing data on the disc 11 passing through.

When the tray 10 brings the disc 11 into the disc drive 1, the spindle motor clamps the disc 11 and rotates the disc 11. The disc 11 is off the tray 10 and hold by the spindle motor as the spindle motor clamps the disc 11. While the disc drive 1 reads at high speed, the rotating disc 11 generates rotating airflow, which is divided into an upper airflow on an upper surface of the disc 11 and a lower airflow between a lower surface of the disc 11 and the tray 10. The upper airflow flows along the disc surface smoothly; the lower airflow of the disc 11 flows along the tray 10 smoothly. However, the central hole 1016 of the tray 10 that provides a space for removing the heat from the OPU while the OPU moves around and reading/writing data on the disc 11, since a part of the lower airflow could flow through the OPU so as to reach the effect of heat-dissipating.

It should be noted that the loading surfaces 1012,1014 of the tray 10 are plane-shaped to support the disc 11. Therefore, when the disc drive reads at high speed, the lower airflow passing through the central hole 1016 is limited since the lower airflow is guided by the plane-shaped loading surfaces 1012, 1014. Therefore the effect of heat-dissipating is poor so as to necessarily add additional heat-dissipating device. It can be seen that to add the additional heat-dissipating is difficult due to the limited space; on the other hand, the cost may be increase as well.

As a conclusion, how to improve the heat-dissipating effect of the OPU without increasing the cost and under the prior conditions is an important issue to the persons skilled in the art.

SUMMARY OF THE INVENTION

The objective of the present invention is to provide a heat-dissipating structure of a disc drive, wherein the heat-dissipating structure is mounted on a surface of a tray surface of the disc drive for promoting the heat-dissipating effect of an optical pickup unit (OPU) in the disc drive.

In accordance with the present invention, the heat-dissipating structure comprises a tray and a diversion plate. The tray has a body with a concavity loading surface for loading a disc to be in and out the disc drive, and the loading surface has a central hole. Further the diversion plate is disposed on one side of the loading surface, and connected to the loading surface, wherein the diversion plate extends downward and slopes from the connection of the diversion plate and the loading surface.

In the preferred embodiment, the loading surface and the diversion plate are integrated as one member. The surface of the diversion plate is lower than the loading surface. Further that the diversion plate is downward sloped and toward a central hole.

In the preferred embodiment, the heat-dissipating structure further comprises an extended part connecting to the diversion plate, the extended part is formed from the diversion plate to a back end of the tray, and the extended part is downward sloped and toward the central hole, wherein the loading surface, the diversion plate, and the extended part are integrated as one member.

Besides, the heat-dissipating structure of the present invention further comprises a diversion baffle and connects to the loading surface. The surface of the diversion baffle is higher than that of the diversion plate, and a gap is between the diversion baffle and the diversion plate. The loading surface, the diversion plate, and the diversion baffle are integrated as one member. And the diversion baffle is downward sloped and toward the central hole.

BRIEF DESCRIPTION OF THE DRAWINGS

Other features and advantages of this invention will become more apparent in the following detailed description of the preferred embodiments of this invention, with reference to the accompanying drawings, in which:

FIG. 2b illustrates a schematic cross sectional view of a line aa' of FIG. 2a;

FIG. 2c illustrates a schematic cross sectional view of a line bb' of FIG. 2a;

FIG. 4b illustrates a schematic cross sectional view of a line bb' of FIG. 4a.

DETAILED DESCRIPTIONS OF THE PREFERRED EMBODIMENT

The present invention provides a heat-dissipating structure of a tray applied to a disc drive, that can lead airflow produced by a rotated disc into a descent part of the tray. Airflow between the tray and the disc is thus moved downward so as to increase the flowing speed and the flowing quantity of the airflow flowing through an optical pickup unit (OPU), and then improve the heat-dissipating ability of the electronic element in the disc drive.

Figure 1:
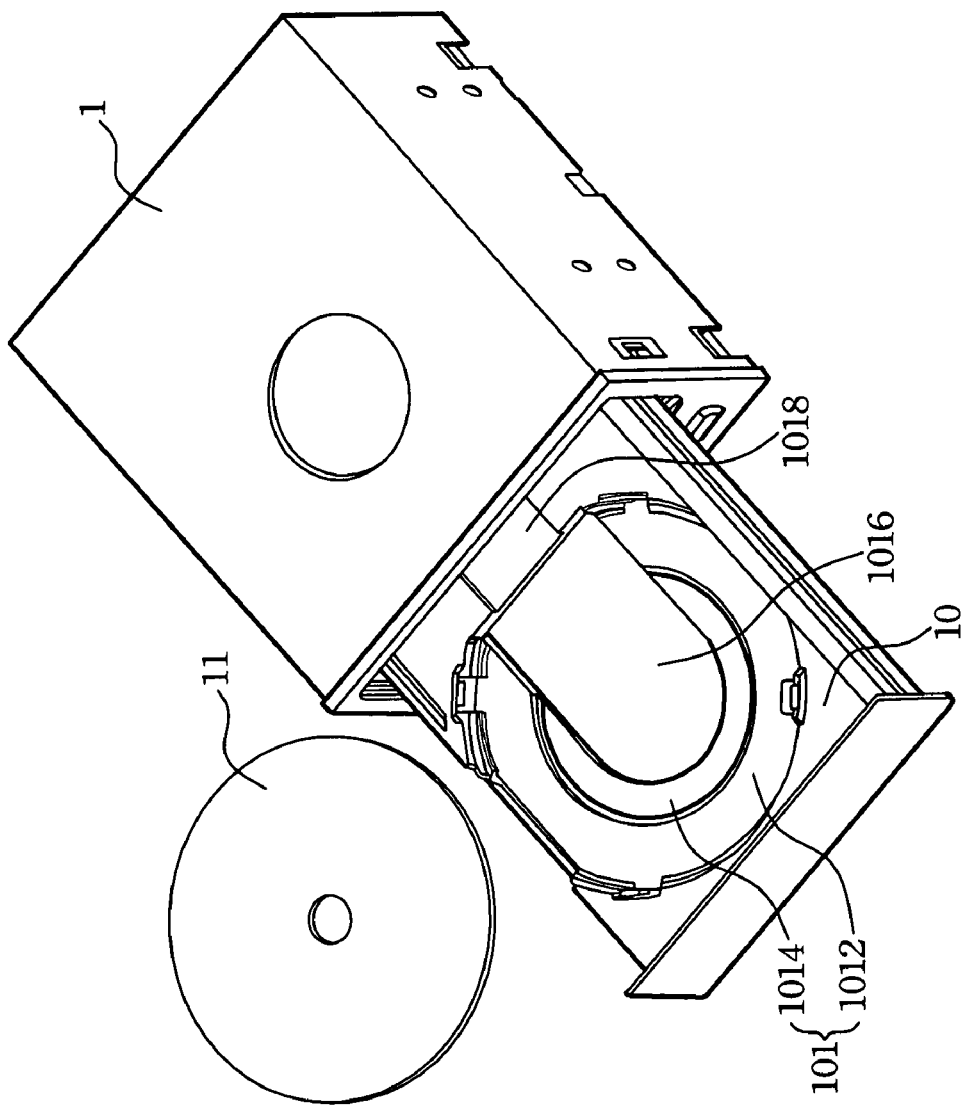
FIG. 1 illustrates a schematic view of a disc drive based on prior arts.
Figure 2A:
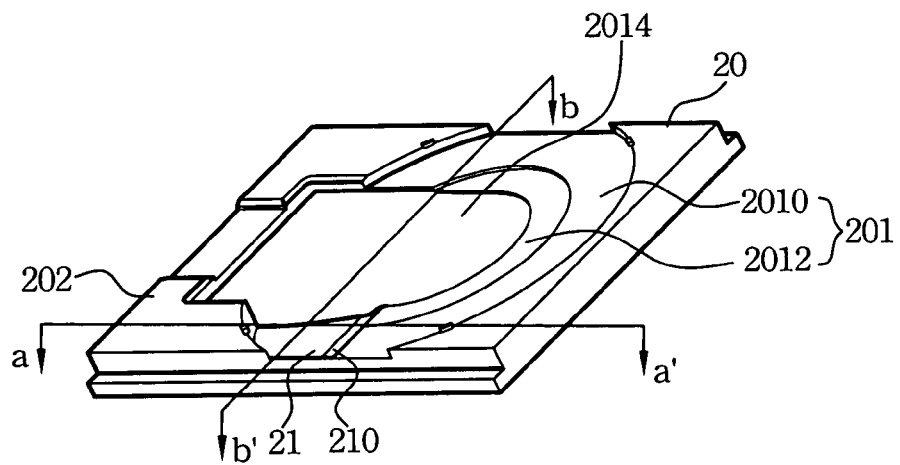
FIG. 2a illustrates a schematic view of a first embodiment of a heat-dissipating structure of a disc drive of the present invention.
Figure 2B:
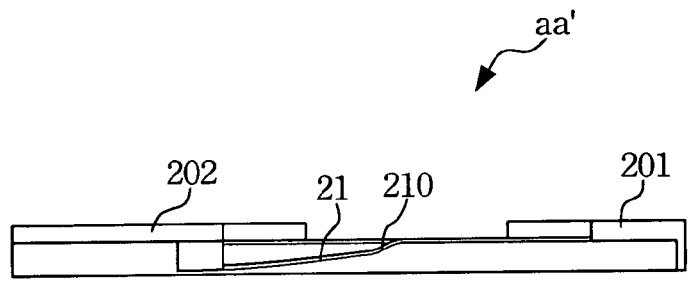
Figure 2C:
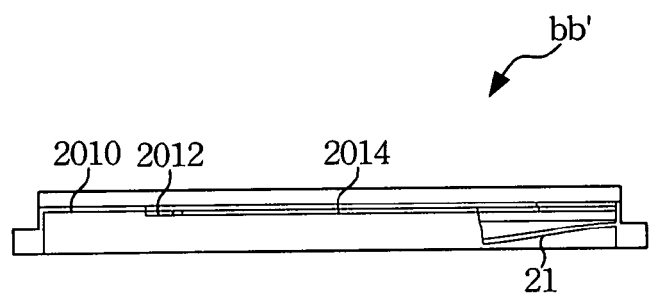

Please refer to FIGS. 2a to 2c, which illustrate a schematic view of a first embodiment of a heat-dissipating structure of a disc drive of the present invention, a schematic cross sectional view of a line aa' of FIG. 2a, and a schematic cross sectional view of a line bb' of FIG. 2a. The heat-dissipating structure of the present invention comprises a tray 20 and a diversion plate 21. The tray 20 is movably mounted on the disc drive for loading a disc. The tray 20 comprises a body 201 having a first concavity loading surface 2010, and inside of the first loading surface 2010 has a second concavity loading surface 2012. The first loading surface 2010 and the second loading surface 2012 form a disc-containing area, which has a central hole 2014 to let the motor and the OPU pass through.

The diversion plate 21 is mounted on one side of the loading surfaces 2010 and 2012, and comprises an inclined plane 210 between the diversion plate 21 and the loading surfaces 2010 and 2012 as a buffer area of the connection of both. It is to be noted that the surface of the diversion plate 21 is lower than the loading surfaces 2010 and 2012, and the diversion plate 21 is sloped downward along the rotating direction of the disc.

Please refer to FIGS. 2b and 2c. For the embodiment, the diversion plate 21 is sloped downward from the loading surfaces 2010 and 2012 to a back end 202 of the tray 20, and the diversion plate 21 is also sloped downward from the peripherals of the loading surfaces 2010 and 2012 to the central hole 2014. In other words, the diversion plate 21 is about circularly sloped downward and toward the central hole 2014.

Hence, when the disc is in rotation, the airflow driven by the rotating is moved downward along the diversion plate 21 to increase the speed and the quantity of the airflow passing through the OPU for promoting the heat-dissipating effect to the OPU.

The body 201, the loading surfaces 2010 and 2012, and the diversion plate 21 are integrated as one member and made of the plastics. The member normally adopts the way of an eject-rod or eject-board of the injection molding to de-molded.

Figure 3:
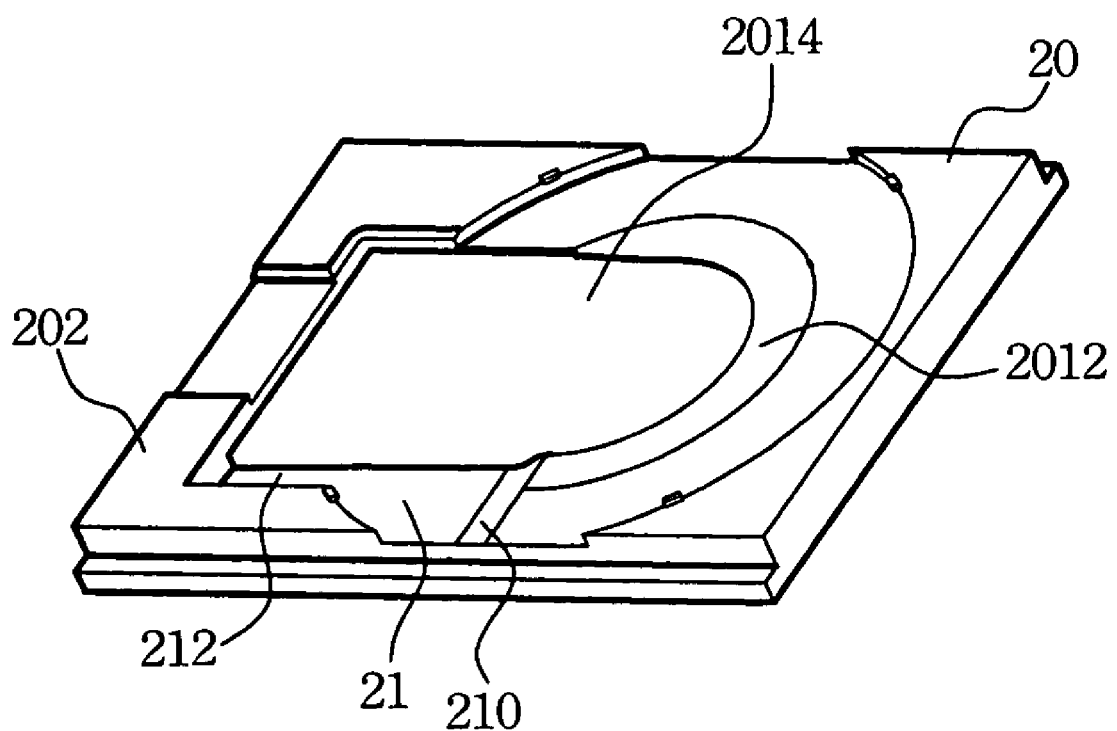
FIG. 3 illustrates a schematic view of a second preferred embodiment of the heat-dissipating structure of the disc drive of the present invention.

Please refer to FIG. 3, which illustrates a schematic view of a second preferred embodiment of the heat-dissipating structure of the disc drive of the present invention. With the differences of the second preferred embodiment to the first preferred embodiment, the heat-dissipating structure of the disc drive further includes an extended part 212 so as to increase the area thereof. The extended part 212 is a continuous of the diversion plate 21 and extended toward the back end 202 of the tray 20. The extended part 212 is sloped downward and toward the central hole 2014.

The slope direction of the diversion plate 21 in this embodiment is similar to the first embodiment, but the diversion area is larger. Therefore, when the airflow flows to the diversion plate 21 and continuously goes to the extended part 212, comparatively the flow speed and the quantity of the airflow are increased so as to enhance the heat-dissipating effect.

Figure 4A:
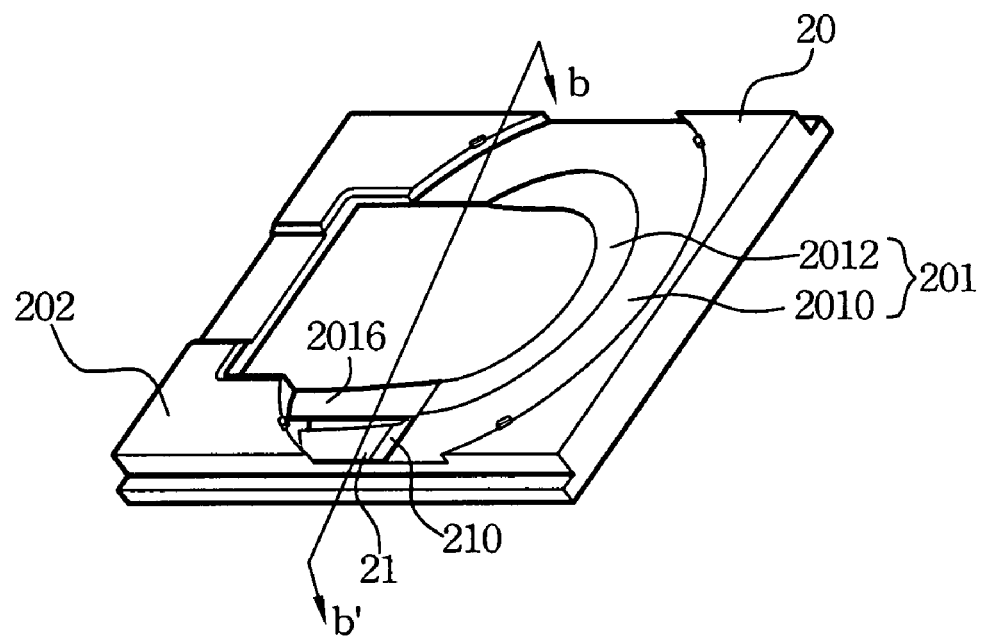
FIG. 4a illustrate a schematic view of a third preferred embodiment of the heat-dissipating structure of the disc drive of the present invention.
Figure 4B:
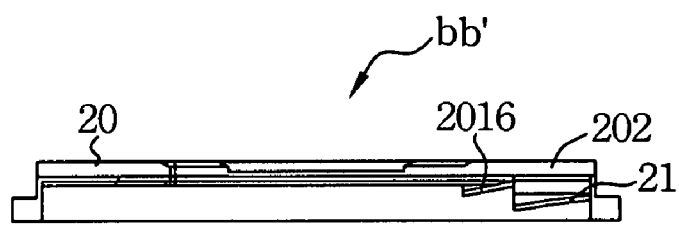

Please refer to FIGS. 4a and 4b, which illustrate a schematic view of a third preferred embodiment of the heat-dissipating structure of the disc drive of the present invention and a schematic cross sectional view of a line bb' of FIG. 4a. For the preferred embodiment, the heat-dissipating structure of the disc drive further comprises a diversion baffle 2016.

The diversion baffle 2016 and the diversion plate 21 are set on one side of the loading surfaces 2010 and 2012, and connect to the loading surfaces 2010 and 2012.

Please be noted that the diversion baffle 2016 is sloped downward and toward the central hole 2014. The surface of the diversion baffle 2016 is higher than that of the diversion plate 21, and there is a gap between the diversion baffle 2016 and the diversion plate 21. Therefore, the airflow driven by the rotated disc can be led out by the diversion baffle 2016 and the diversion plate 21 and flow through the gap. The separated structure speeds up the flow rate in order to effectively direct the airflow to the OPU for better dissipation.

The heat-dissipating structure in the present invention makes a height difference on the surface of the tray of the disc drive. By ways of the airflow driven by the rotated disc and the non-slip boundary condition generated on the surface of the tray, the air may flow downward and through the height difference so as to increase the flow rate of the lower layer airflow; simultaneously, the air may be led to a location with a heat source, such as the OPU. Therefore, the heat can be brought out effectively so as to enhance the heat-dissipation effect of the disc drive.

What is claimed is:

1. A heat-dissipating structure of a disc drive, comprising:
   a tray having a body with a concavity loading surface for loading a disc to be in and out the disc drive, and the loading surface having a central hole; and
   a diversion plate being disposed on one side of the loading surface and connected to the loading surface;
   wherein the diversion plate extends downward and slopes from the connection of the diversion plate and the loading surface,
   wherein the diversion plate is downward sloped and toward the central hole and the back end of the tray.

2. The heat-dissipating structure according to claim 1, wherein the loading surface and the diversion plate are integrated as one member.

3. The heat-dissipating structure according to claim 1, wherein the surface of the diversion plate is lower than the loading surface.

4. The heat-dissipating structure according to claim 1 further comprising an extended part connecting to the diversion plate, the extended part is formed from the diversion plate to a back end of the tray, and the extended part is downward sloped and toward the central hole.

5. The heat-dissipating structure according to claim 4, wherein the loading surface, the diversion plate, and the extended part are integrated as one member.

6. The heat-dissipating structure according to claim 1 further comprising a diversion baffle, which connects to the loading surface.

7. The heat-dissipating structure according to claim 6, wherein the surface of the diversion baffle is higher than that of the diversion plate, and a gap is between the diversion baffle and the diversion plate.

8. The heat-dissipating structure according to claim 6, wherein the loading surface, the diversion plate, and the diversion baffle are integrated as one member.

9. The heat-dissipating structure according to claim 6, wherein the diversion baffle is downward sloped and toward the central hole.

* * * * *